US012695538B2

(12) United States Patent
Krebs et al.

(10) Patent No.: US 12,695,538 B2
(45) Date of Patent: Jul. 28, 2026

(54) COMPRESSED PSDU FORMAT FOR NBA-MMS-UWB CONTROL SIGNALS

(71) Applicant: APPLE INC., Cupertino, CA (US)

(72) Inventors: Alexander Krebs, Munich (DE); Su Khiong Yong, Cupertino, CA (US); Moche Cohen, Pardes Hanna (IL); Santhoshkumar Mani, Sunnyvale, CA (US); Lochan Verma, Danville, CA (US); Yong Liu, Cupertino, CA (US); Jinjing Jiang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 305 days.

(21) Appl. No.: 18/468,361

(22) Filed: Sep. 15, 2023

(65) Prior Publication Data

US 2024/0163006 A1 May 16, 2024

Related U.S. Application Data

(60) Provisional application No. 63/499,841, filed on May 3, 2023, provisional application No. 63/383,568, filed on Nov. 14, 2022.

(51) Int. Cl.
*H04L 1/00* (2006.01)

(52) U.S. Cl.
CPC ................................. *H04L 1/0007* (2013.01)

(58) Field of Classification Search
None
See application file for complete search history.

(56) References Cited

U.S. PATENT DOCUMENTS

| | | | |
|---|---|---|---|
| 12,047,131 B2 * | 7/2024 | Ferrante ................ | H04W 72/56 |
| 2005/0220145 A1 * | 10/2005 | Nishibayashi ........ | H04W 99/00 |
| | | | 370/474 |
| 2009/0232124 A1 * | 9/2009 | Cordeiro .................. | H01Q 3/26 |
| | | | 370/349 |
| 2020/0136753 A1 * | 4/2020 | Zhang .................... | H04L 1/0083 |
| 2024/0397440 A1 * | 11/2024 | Yu .......................... | H04L 5/0053 |

FOREIGN PATENT DOCUMENTS

WO      WO-2017219214 A1 * 12/2017     ........... H04W 28/26

* cited by examiner

*Primary Examiner* — Gerald A Smarth
(74) *Attorney, Agent, or Firm* — Dorsey & Whitney LLP

(57) ABSTRACT

A wireless device may transmit ranging transmissions using a compressed PSDU. The compressed PSDU may be configured to support poll packets, response packets, and report packets. The compressed PSDU may comprise an identifier (ID) field, an address field, ID specific data, and a cyclic redundancy check (CRC) field. Further, the wireless device may use an optimized header IE for broadcast.

20 Claims, 15 Drawing Sheets

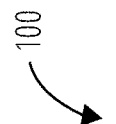
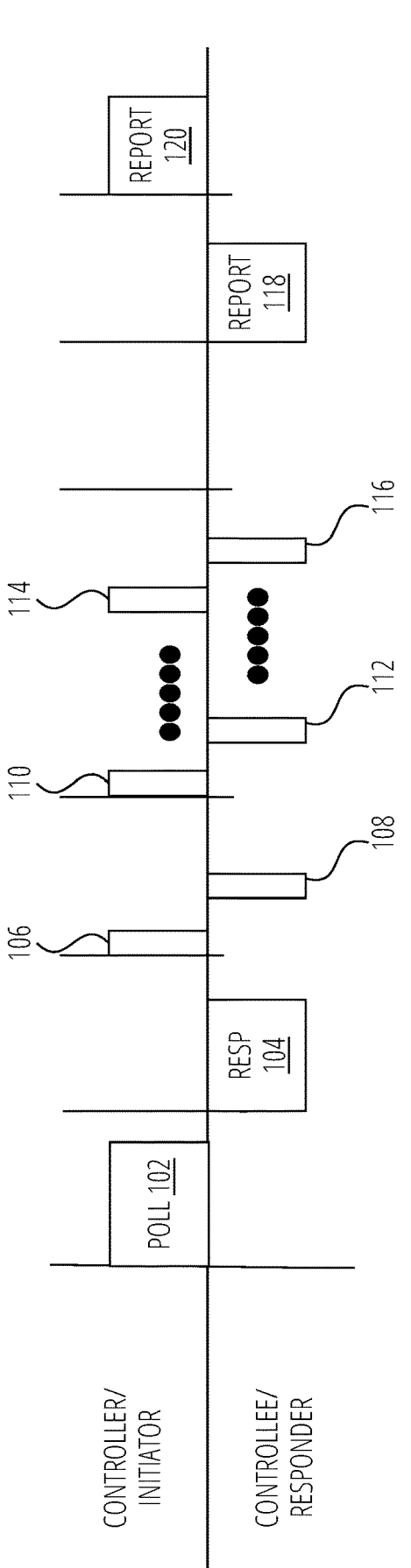
FIG. 1

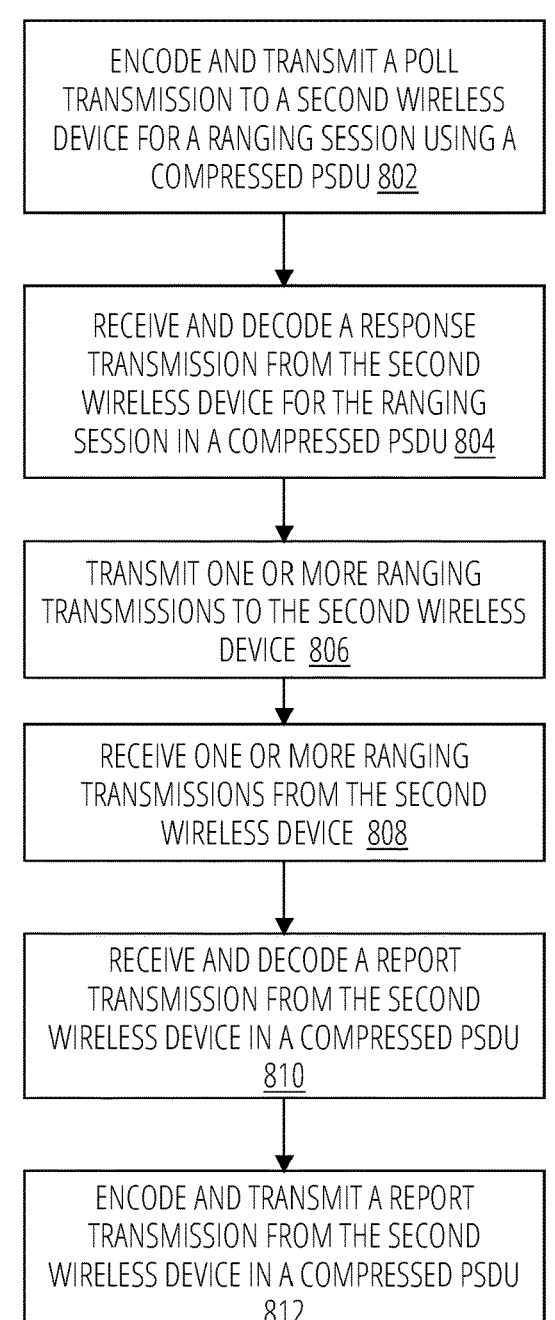

ENCODE AND TRANSMIT A POLL TRANSMISSION TO A SECOND WIRELESS DEVICE FOR A RANGING SESSION USING A COMPRESSED PSDU 802

RECEIVE AND DECODE A RESPONSE TRANSMISSION FROM THE SECOND WIRELESS DEVICE FOR THE RANGING SESSION IN A COMPRESSED PSDU 804

TRANSMIT ONE OR MORE RANGING TRANSMISSIONS TO THE SECOND WIRELESS DEVICE 806

RECEIVE ONE OR MORE RANGING TRANSMISSIONS FROM THE SECOND WIRELESS DEVICE 808

RECEIVE AND DECODE A REPORT TRANSMISSION FROM THE SECOND WIRELESS DEVICE IN A COMPRESSED PSDU 810

ENCODE AND TRANSMIT A REPORT TRANSMISSION FROM THE SECOND WIRELESS DEVICE IN A COMPRESSED PSDU 812

FIG. 8

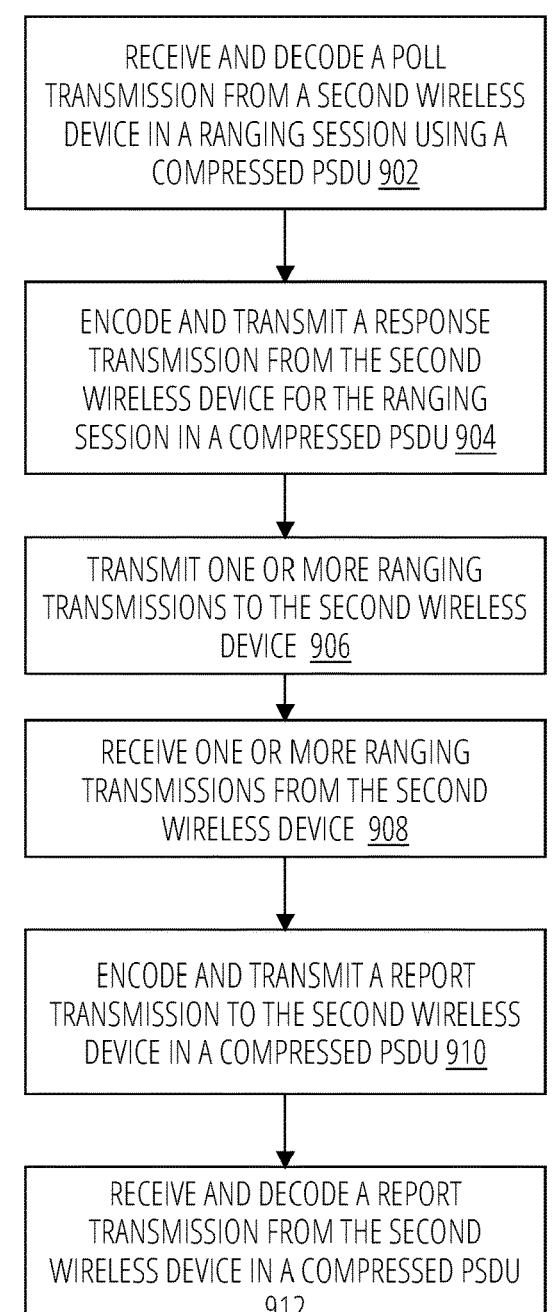

RECEIVE AND DECODE A POLL TRANSMISSION FROM A SECOND WIRELESS DEVICE IN A RANGING SESSION USING A COMPRESSED PSDU 902

ENCODE AND TRANSMIT A RESPONSE TRANSMISSION FROM THE SECOND WIRELESS DEVICE FOR THE RANGING SESSION IN A COMPRESSED PSDU 904

TRANSMIT ONE OR MORE RANGING TRANSMISSIONS TO THE SECOND WIRELESS DEVICE 906

RECEIVE ONE OR MORE RANGING TRANSMISSIONS FROM THE SECOND WIRELESS DEVICE 908

ENCODE AND TRANSMIT A REPORT TRANSMISSION TO THE SECOND WIRELESS DEVICE IN A COMPRESSED PSDU 910

RECEIVE AND DECODE A REPORT TRANSMISSION FROM THE SECOND WIRELESS DEVICE IN A COMPRESSED PSDU 912

FIG. 9

| Phase | Message | Octet 0 (Message ID) | Octets 1-N [Len] | Description |
|---|---|---|---|---|
| Control | POLL | 0x00 | [PrivateAddress[3], PrivateSalt[3], MessageControl[1], MessageContent[], CRC16] | A qualifying poll message. More poll messages are tbd.<br><br>MessageControl=0x00: MessageContent={}<br><br>MessageControl=0x01: MessageContent={0x00, 0x00}<br><br>MessageControl=0x02-0xff: reserved |
| | RESP | 0x01 | [PrivateAddress[3], MessageControl[1], MessageContent[], CRC16] | A qualifying response message.<br><br>MessageControl=0x00: MessageContent={}<br><br>MessageControl=0x01: MessageContent={0x00, 0x00, 0x00, 0x00, 0x00}<br><br>MessageControl=0x02-0xff: reserved |
| | POLL (One-to-many) | 0x10 | [PrivateAddress[3], PrivateSalt[3], MessageControl[1], MessageContent[], CRC16] | A poll message for one-to-many ranging session.<br><br>MessageControl=0x00: MessageContent={0x00, 0x00} This is the POLL message for access slots that are not the first one.<br><br>MessageControl = 0x01: MessageContent={Number of Responders[1], SlotsPerResponder[1], List of Responder Address[3]}<br><br>MessageControl = 0x02: MessageContent={Number of Responders[1], SlotsPerResponder[1], List of {Responder Address[3], StartSlotIndex[2], EndSlotIndex[2]}}<br><br>MessageControl = 0x03: Same as Message Control = 0x01, but both Initiator and Responder send the measurement report<br><br>MessageControl = 0x04: Same as MessageControl = 0x02, but both Initiator and Responder send the measurement report<br><br>MessageControl = 0x05: MessageContent={NumberOfAccessSlots[1], SizeOfAccessSlots[1]}<br><br>MessageControl = 0x06: Same as MessageControl = 0x05, but the Response frame and Poll frame in NB is switched<br><br>MessageControl=0x07-0xff: reserved |
| | RESP (One-to-many) | 0x11 | [PrivateAddress[3], MessageControl[1], MessageContent[], CRC16] | A qualifying response message for one-to-many ranging.<br><br>MessageControl=0x00: MessageContent={}<br><br>MessageControl=0x01: MessageContent={0x00, 0x00, 0x00, 0x00, 0x00}<br><br>MessageControl=0x02-0xff: reserved |

| Phase | Message | Octet 0 (Message ID) | Octets 1-N [Len] | Description |
|---|---|---|---|---|
| Measurement Report 1408 | RPRT (from responder) | 0x02 | [PrivateAddress[3], MessageControl[1], MessageContent[], CRC16] | A qualifying report message.<br><br>MessageControl=0x00:<br>MessageContent=(<br>ReplyTime[5],<br>PTDataLength[1],<br>PTData[PTDataLength]), where PTDataLength and PTData fields are optionally present and represent pass through data to higher layers. |
| 1410 / 1412 | RPRT (from initiator) | 0x03 | [PrivateAddress[3], MessageControl[1], MessageContent[], CRC16] | A qualifying report message.<br><br>MessageControl=0x00:<br>MessageContent=(<br>TurnAroundTime[5],<br>PTDataLength[1],<br>PTData[PTDataLength]), where PTDataLength and PTData fields are optionally present and represent pass through data to higher layers. |
| 1426 | RPRT (from responder in one-to-many ranging) | 0x12 | [PrivateAddress[3], MessageControl[1], MessageContent[], CRC16] | A qualifying report message for one-to-many ranging.<br><br>MessageControl=0x00:<br>MessageContent=(<br>ReplyTime[5],<br>PTDataLength[1],<br>PTData[PTDataLength]), where PTDataLength and PTData fields are optionally present and represent pass through data to higher layers. |
| 1428 | RPRT(from initiator in one-to-many ranging) | 0x13 | [PrivateAddress[3], MessageControl[1], MessageContent[], CRC16] | A qualifying report message for one-to-many ranging.<br><br>MessageControl=0x00:<br>MessageContent=(<br>TurnAroundTime[5],<br>PTDataLength[1],<br>PTData[PTDataLength]), where PTDataLength and PTData fields are optionally present and represent pass through data to higher layers. |

FIG. 14B

| Phase | Message | Octet 0 (Message ID) | Octets 1-N [Len] | Description |
|---|---|---|---|---|
| Initialization 1414 | ADV-POLL | 0x20 | [PrivateAddress[3], PrivateSalt[3], MessageControl[1], MessageContent[], CRC16] | Advertising poll message used by initiator during initialization phase.<br><br>MessageControl=0x00:<br>MessageContent={LEN[1] ARRAY[]}<br><br>Where LEN is the number of octets of ARRAY[], and ARRAY is the list of supported message control commands for ADV-RESP and SOR.<br><br>MessageControl=0x01-0xff: Reserved |
| 1416 1418 | ADV-RESP | 0x21 | [PrivateAddress[3], MessageControl[1], MessageContent[], CRC16] | Advertising response packet used by responder during initialization phase.<br><br>MessageControl=0x00: Reserved<br><br>MessageControl=0x01:<br>MessageContent={<br>NB Channel Select[2],<br>UWB PHY Config[2],<br>UWB MAC Config[2],<br>NB PHY Config[1],<br>NB MAC Config[8]}<br><br>MessageControl=0x02-0xff: Reserved |
| 1420 | SOR | 0x22 | [PrivateAddress[3], MessageControl[1], MessageContent[], CRC16] | Start of ranging packet used by initiator during initialization phase.<br><br>MessageControl=0x00: Reserved<br><br>MessageControl=0x01:<br>MessageContent={<br>Time Offset[2],<br>NB Channel Seed[1],<br>NB Channel Select[2],<br>UWB PHY Config[2],<br>UWB MAC Config[2],<br>NB PHY Config[1],<br>NB MAC Config[8]}<br><br>MessageControl=0x02-0xff: Reserved |
| | | 0x23-0x2f | | Reserved for out of session |
| | Reserved | 0x7f-0xff | Vendor specific | 128x256 PSDUs with 2-byte message ID |

| Field name 1502 | Length in bits | Description |
|---|---|---|
| CRC16 | 16 | 2-octet FCS defined in 7.2.11 |
| PrivateAddress 1504    1506 | 24 | = AES-128-ECB(key=PublicAddress, data=PrivateSalt]) % 2^24 where PublicAddress may be an 802.15.4 MAC source/destination address and/or PAN ID, or an address set by a higher layer. (input MSBs zero-padded) |
| PrivateSalt | 24 | Static during one ranging block, at least |
| MessageControl 1508 | 8 | Control over MessageContent |
| MessageContent 1510 | var | Content controlled by MessageID and MessageControl on per message basis |
| PTDataLength 1512 | 8 | Number of octets in PTData |
| PTData 1514 | PTData Length*8 | Optional data passed through to next higher layer |
| NB Channel Selection 1516 | 16 | Bits 0-1: UNII-3 border channel exclusion {0, 1, 3, 7} Bits 2-4: UNII-5 low-side channel exclusion {0, 1, 3, 7, 15, 31, 63, 127} Bits 5-7: UNII-5 high-side channel exclusion {0, 1, 3, 7, 15, 31, 63, 127} Bits 8-12: low-side channel start offset (0-31) Bits 13-15: Channel skip length {0, 1, 3, 7, 15, 31, 63, 127} |
| UWB PHY Config 1518 | 16 | Bits 0-3: RSF Code Index {33, ..., 48} Bits 4-10: RSF complementary set zeros {0, ..., 64} Bits 11-13: N_MSR {32, 40, 48, 64, 128, 256} Bits 14-15: STS Segment Length x512 {32, 64, 128, 256} |
| UWB MAC Config 1520 | 8 | Bits 0-2: {0,1,2,4,8,16} X RSFs Bits 3-5: {0,1,2,4,8} Y RIFs Bits 6: {1ms/2ms} Z RSF-to-RIF gap Bits 7: reserved |
| NB MAC Config 1522 | 64 | Bits 0-4: UWB Channel {1, ..., 32} Bits 5-7: Ranging Slot Duration {300, 600, ..., 2400} RSTUs Bits 8-15: Ranging Round Duration 0-255 ranging slots Bits 16-23: Ranging Block Duration 0-255 ranging rounds Bit 24: Channel Switching: 0=Disabled, 1=Blockwise Bit 25: Measurement Report Request: 0=No, 1=Yes Bits 26-31: Reserved Bits 32-35: RcpPollSlots=0-15 Bits 36-39: RcpResponderSlots=0-15 Bits 40-51: RpDuration=0-4095 Bits 42-55: RpOffset=0-15 Bits 56-59: MrpFirstSlots=0-15 Bits 60-63: MrpSecondSlots=0-15 |
| Time Offset 1524 | 16 | Time offset in microseconds between end of SOR packet and beginning of first POLL packet of starting ranging session. Range: 0 to 65535us |
| NB Channel Seed 1526 | 8 | 0-255: Sets key for switching function AES-128-ECB(key=Seed, ...) referred to in section 1.4.3 (input MSBs zero-padded) |
| NB PHY Config 1528 | 8 | Sets O-QPSK PHY #1-#10 in section 1.2.3 {#1: 250k uncoded, ..., #10} Bits 0-3: NB Control Phase Bits 4-7: NB Report Phase |

FIG. 15

COMPRESSED PSDU FORMAT FOR NBA-MMS-UWB CONTROL SIGNALS

TECHNICAL FIELD

This application relates generally to wireless communication systems, including systems that use optimized PSDUs for control signals.

BACKGROUND

Wireless communication technology uses various standards and protocols to transmit data between wireless communication devices. Wireless communication system standards and protocols can include, for example, wireless personal area networks (WPANs), fine ranging (FiRa), IEEE 802.15.4 standard for Low-Rate Wireless Networks, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by IEEE 802.15, wireless signals can be used to communicate between devices. IEEE 802.15 defines standards addressing wireless networking for the emerging Internet of Things (IoT), allowing these devices to communicate and interoperate with one another. The devices may include mobile devices, wearables, autonomous vehicles, etc.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1 illustrates a NBA-MMS-UWB transmission sequence in accordance with some embodiments.

FIG. 8 illustrates a flow chart of a method 800 for a controller/initiator executing a ranging session using the compressed PSDUs in accordance with some embodiments.

FIG. 9 illustrates a flow chart of a method 900 for a controlee/responder executing a ranging session using the compressed PSDUs in accordance with some embodiments.

FIGS. 14A-14C is a table comprising information regarding compressed PSDU messages in accordance with some embodiments.

FIG. 15 illustrates a table comprising information regarding compressed PSDU message fields in accordance with some embodiments.

DETAILED DESCRIPTION

Figure 2:
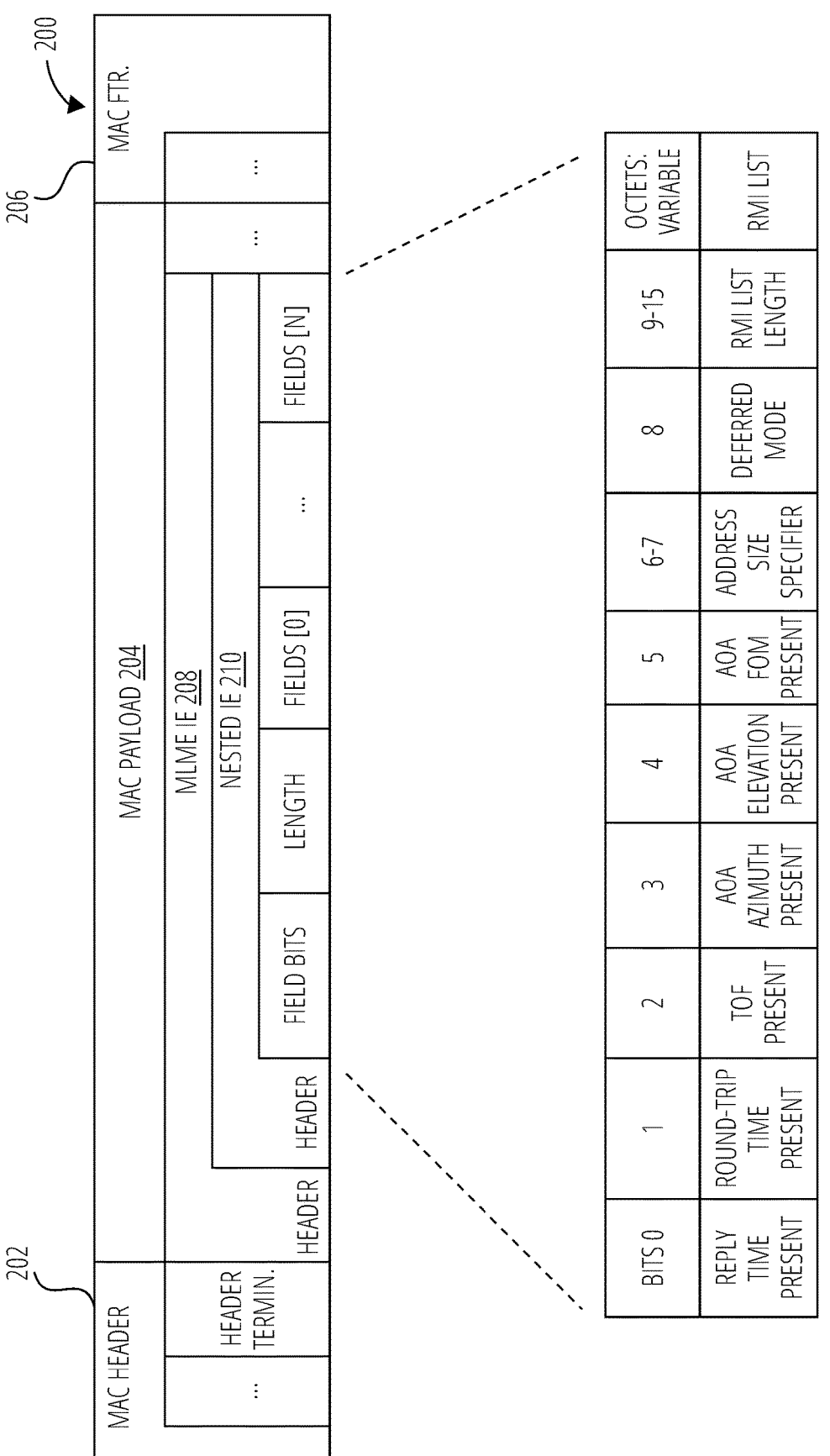
FIG. 2 illustrates a PSDU and IE format that is currently being used for NBA-MMS-UWB in accordance with some embodiments.

Embodiments of the present disclosure may provide techniques for utilizing a hybrid of ultra-wideband (UWB) and narrowband (NB) signaling for performing wireless communication between devices. Devices may use this hybrid signaling for determining a distance between two devices. The hybrid signaling may be performed according to a ranging protocol, involving bi-directional NB and UWB signaling between a first device and a second device. For instance, the NB signaling may be used to schedule a series of UWB signals sent between the two devices. The NB signaling may also be used to report information regarding the series of UWB signaling to determine a distance between the first device and the second device.

NB signaling may have a low payload capacity. Therefore, it may be useful for data transmitted using the NB to be optimized and reduce overhead. The data may be organized into a physical layer (PHY) service data unit (PSDU). Some embodiments herein comprise a compressed PSDU format for NB-assisted (NBA) multi-millisecond (MMS) UWB (NBA-MMS-UWB) control signals. Some embodiments herein comprise an optimized header information element (IE) for broadcast signaling. The PSDU format and the optimized header IE format of the embodiments herein may reduce overhead of a transmission and reduce energy consumption of devices.

Various embodiments are described with regard to a user equipment (UE), initiator, controller, controlee, or responder. However, reference to a UE, initiator, controller, controlee, or responder is merely provided for illustrative purposes. The example embodiments may be utilized with any electronic component that may establish a communication interface and is configured with the hardware, software, and/or firmware to exchange information and data over the communication interface. Therefore, the devices as described herein are used to represent any appropriate electronic component.

FIG. 1 illustrates a NBA-MMS-UWB transmission sequence 100 in accordance with some embodiments. As shown, the controller/initiator may transmit a poll packet 102. The controlee/responder may send a response packet 104. The poll packet 102 and the response packet 104 may be used for Carrier Frequency Offset (CFO) synchronization for MMS-UWB (e.g., transmissions 106, 108, 110, 112, 114, 116). Optionally, the poll packet 102 and the response packet 104 may include a payload for medium access control (MAC) synchronization and control. The poll packet 102 and the response packet 104 may be transmitted using NB.

The controller/initiator and the controlee/responder may each send a multi-millisecond segments (MMS) transmissions (e.g., transmissions 106, 108, 110, 112, 114, 116) using UWB. The controller/initiator and the controlee/responder may determine measurement data from the transmissions 106, 108, 110, 112, 114, 116. For example, the devices may determine timestamps of when the transmissions 106, 108, 110, 112, 114, 116 were received. The devices may send report packets (e.g., report 118 and report 120) to each other. The report packets may include a payload with measurement report data. The measurement report data may include timestamps. The devices may use the timestamps to determine a distance between the devices (e.g., calculating the distance based on the difference between the transmission time and the reception time).

Some embodiments herein describe a compressed PSDU that may be used for the poll packet 102, the response packet 104, and the report packets. The UWB High Rate Pulse Repetition Frequency (HRP) PHYs that the transmissions 106, 108, 110, 112, 114, 116 use have some regulatory requirements. One of those regulatory requirements for the UWB transmission packets is that if the transmission packet is longer than 1 millisecond, then the average Effective Isotopically Radiated Power (EIRP) must be reduced. While the NB (e.g., NB Offset Quadrature Phase Shift Keying (O-QPSK) 250 k PHY) transmissions do not have the same requirement, implementation may be simplified if both the UWB packets and the NB packets are transmitted using the same timing grid. Accordingly, some embodiments may use a 1 millisecond timing grid for both NB and UWB packets.

However, at 1 millisecond, the NB packets may have a very limited payload capacity. For example, NB O-QPSK 250 k PHY has a payload capacity of 24 bytes per 1 millisecond. Additionally, embodiments herein contemplate a PSDU format to fulfill the functions of poll, response, and report packets. Some embodiments may include extended features (e.g., angle of arrival) which may require a higher rate modulation (e.g., 500 k/1 M).

FIG. 2 illustrates a PSDU 200 and IE format that is currently being used for NBA-MMS-UWB. Specifically, the illustrated PSDU 200 may be used for reporting timestamps. The PSDU 200 includes a MAC Payload 204 (e.g., Encrypted Measurement Report IE, TOF present), and MAC Header 202 and a MAC Footer 206. As shown, there is a significant amount of overhead in the PSDU 200 due to the nested format of the PSDU 200.

The MAC Payload 204 includes a 2-octet MAC Layer Management Entity (MLME) (i.e. MLME IE 208) IE 208 header which is a container for the Nested IE 210. The Nested IE 210 includes a 2-octet IE header that indicates the type and length of the Nested IE 210 (e.g., type=RMI IE, length=4). The MAC Payload 204 also includes a 2-octet field bitmask+field length and a 4-octet timestamp. The MAC Header 202 and MAC Footer 206 include a 2-octet Frame Control, a 2-octet Dst Short Addr, a 1-octet AuxSecHeader, an 8-octet ENC-MIC-64, and a 2-octet CRC16

The illustrated PSDU 100 includes 25 bytes. In the PSDU 200, 4 bytes are used to report the timestamp and 8 bytes are used for a cryptographic checksum. These 12 bytes are the only information used for reporting the timestamp. The remaining 13 bytes are included for compliance and interoperability. Accordingly, there may be more than 50 percent overhead when a timestamp is reported. Embodiments herein provide a compressed PSDU to reduce this overhead for reporting a timestamp.

Figures 3, 4:
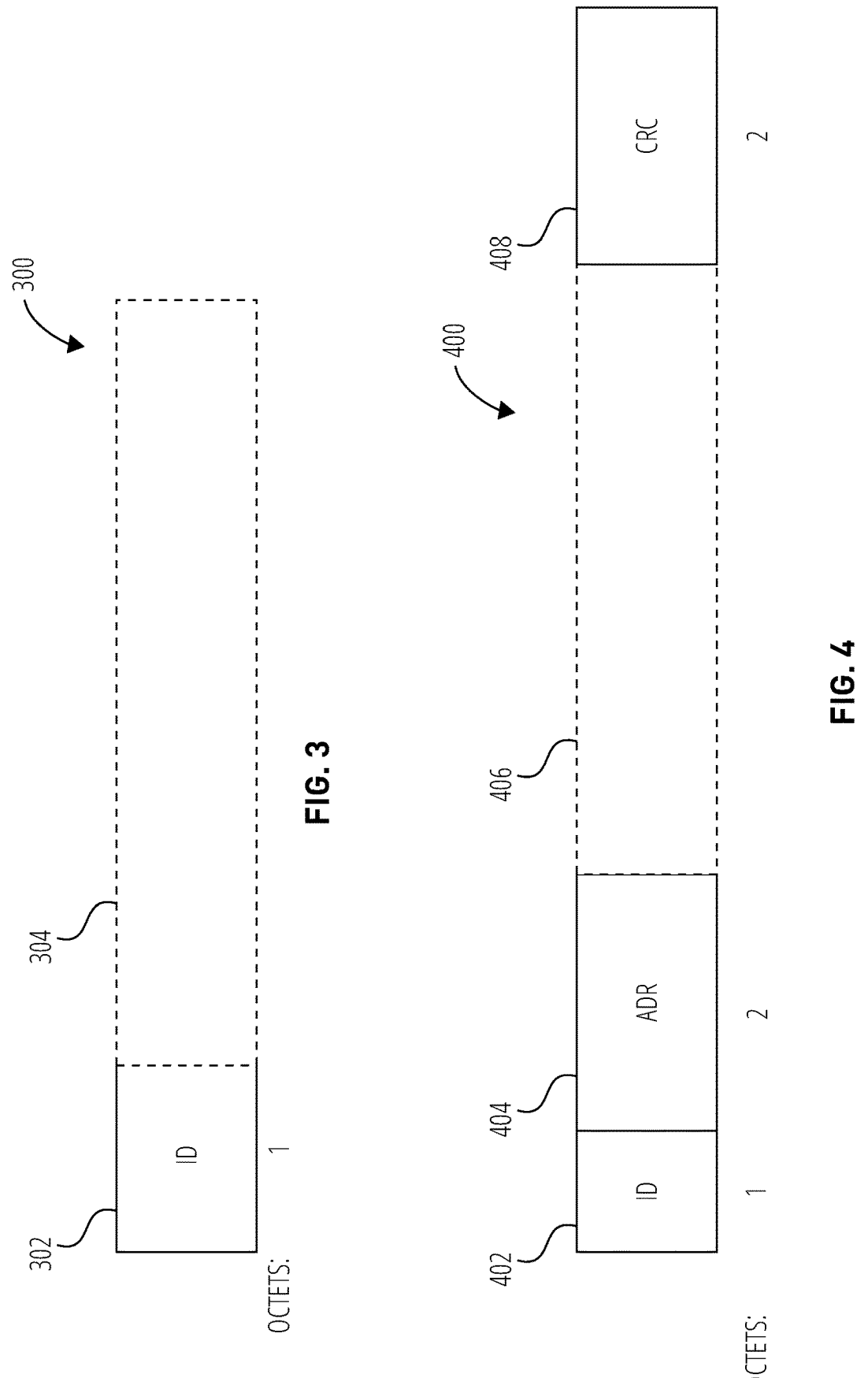
FIG. 3 illustrates a generic compressed PSDU format according to some embodiments
FIG. 4 illustrates a compressed PSDU format for MMS NB control frames according to some embodiments.

FIG. 3 illustrates a generic compressed PSDU 300 format according to some embodiments. As shown, the PSDU 300 lacks much of the nested structure of the PSDU 200 of FIG. 2 (e.g., MAC footer and header, MLME IE header, etc.). The additional information may not be needed because the application may already have that information from a previous transmission.

The first octet 302 may comprise a PSDU ID. The first octet 302 may be used to indicate the application (e.g., poll, response, report) of the remaining bytes that follow in the compressed PSDU. In some embodiments, the PSDU may be extendable. For example 0-127, 128-255 reserved for 2-octet extension, etc. In some embodiments, the first octet 302 may be used to indicate the extension. The remaining portion 304 of the compressed PSDU content may be ID specific.

FIGS. 3-7 illustrate ways in which the PSDU 300 may be adapted to be used for ranging applications.

FIG. 4 illustrates a compressed PSDU 400 format for MMS NB control frames according to some embodiments. The MMS NB control frames may include a poll frame (e.g., poll packet 102 from FIG. 1), a response frame (e.g., response packet 104 from FIG. 1), and a report frame (e.g., report 118 from FIG. 1). The compressed PSDU 400 is an implementation of the generic PSDU 300 shown in FIG. 3.

The compressed PSDU 400 may comprise a 1-octet message ID 402. The 1-octet message ID 402 may indicate the application of the compressed PSDU 400 (e.g., poll, response, report, etc.). For example, in some embodiments the message ID 402 may be set as follows to indicate the function of the compressed PSDU: 0x00=Poll, 0x01=Response, 0x02=Report.

The compressed PSDU 400 may include a 2-, 3-, or 6-octet session identifier/address 404 that indicates the address of the receiving radio. The compressed PSDU 400 may include ID specific data 406 that may have a variable length. Examples of the ID specific data are discussed in more detail in relation to FIGS. 5-7. The compressed PSDU 400 may include a cyclic redundancy check (CRC) 408. The CRC 408 may be a 2-octet cyclic redundancy check (CRC16). As these PSDUs are used in a point to point context with previously established handshake (pre-negotiated point to point connection), there is no need for the additional information shown in the PSDU 200 of FIG. 2. Accordingly, the compressed PSDU 400 is much more efficient while still serving the desired functionality.

Figures 5, 6, 7:
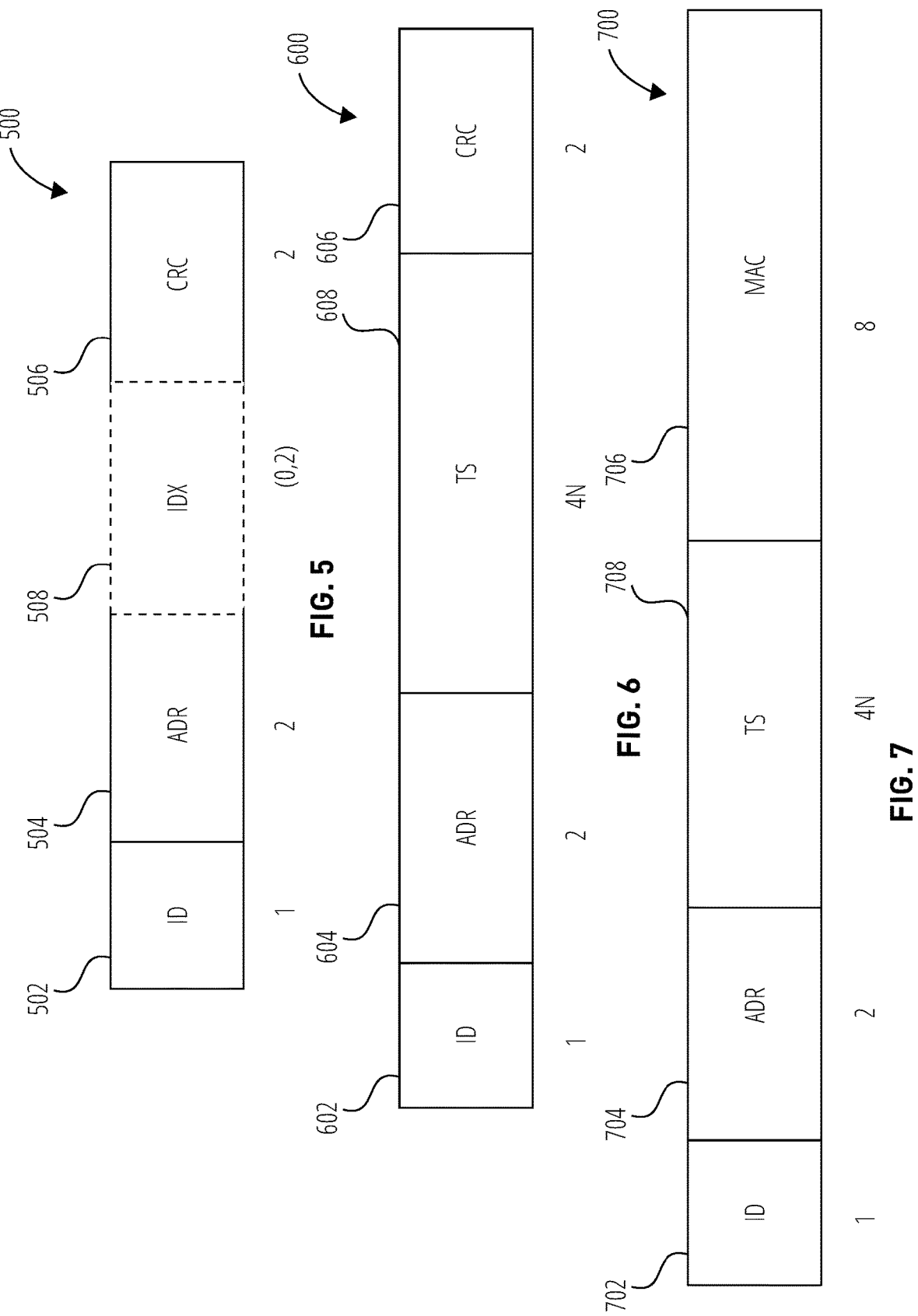
FIG. 5 illustrates a poll/response compressed PSDU in accordance with some embodiments.
FIG. 6 illustrates a report compressed PSDU in accordance with some embodiments.
FIG. 7 illustrates a report compressed PSDU comprising cryptographic protection in accordance with some embodiments.

FIG. 5 illustrates a poll/response compressed PSDU 500 in accordance with some embodiments. The poll/response compressed PSDU 500 is a specific implementation of the compressed PSDU 400 of FIG. 4. As shown, the poll/response compressed PSDU 500 may comprise a 1-octet message ID 502, a 2-, 3-, or 6-octet session identifier/address 504, an optional 2-octet ranging block index 508, and a 2-octet CRC16 506. The poll/response compressed PSDU 500 may be used by a device to send a poll or report packet.

The message ID 502 may indicate whether the poll/response compressed PSDU 500 is a poll PSDU or a response PSDU. For example, the message ID 502 may be set to 0x00 to indicate a poll PSDU, or 0x01 for a response PSDU. The identifier/address field 504 may indicate the address of the receiving radio.

In the illustrated embodiment, the ID specific data included in the poll/response compressed PSDU 500 is the ranging block index 508. This is an optional field that may be included. The ranging block index 508 may indicate the count of the current poll packet. The ranging block index 508 may be used to help synchronize the transceivers. In some embodiments, the ranging block index 508 may be included in a first successful transmission and left out of a following poll/response compressed PSDU 500.

The total length of the poll/response compressed PSDU 500 may be 5 octets if the ranging block index 508 is not included or 7 octets if the ranging block index 508 is included. A receiver (e.g., controller/initiator or controlee/responder) may determine the presence of the optional frame counter (i.e., ranging block index 508) based on a received Physical Layer Header (PHR) length field. If the PHR length field indicates that the poll/response compressed PSDU 500 has a length of 5 octets then the receiver may determine that the ranging block index 508 is not included. If the PHR length field indicates that the poll/response compressed PSDU 500 has a length of 7 octets then the receiver may determine the ranging block index 508 is included.

FIG. 6 illustrates a report compressed PSDU 600 in accordance with some embodiments. The report compressed PSDU 600 is a specific implementation of the compressed PSDU 400 of FIG. 4. As shown, the report compressed PSDU 600 may comprise a 1-octet message ID 602, 2-octet session identifier/address 604, a 4- or 5-octet timestamp(s) field 608, and a 2-octet CRC16 (e.g., CRC 606).

The message ID 602 may indicate that the report compressed PSDU 600 is a report PSDU. For example, the message ID 602 may be set to 0x02 to indicate a report PSDU. The identifier/address 604 may indicate the address of the receiving radio.

In the illustrated embodiment, the ID specific data included in the report compressed PSDU 600 is the timestamp(s) field 608. The timestamp(s) field 608 may indicate when one or more UWB transmissions (e.g., transmissions 106, 108, 110, 112, 114, 116 of FIG. 1) were received. In some embodiments, the timestamp(s) field 608 may include one or more timestamps.

The total length of the report compressed PSDU 600 may be 9 or more octets. The size may depend on the number of timestamps included in the timestamp(s) field 608. A receiver may determine the number of timestamps based on a received PHR length field. If the PHR length field indicates that the report compressed PSDU 600 has a length of 9 octets then the receiver (e.g., controller/initiator or controlee/responder) may calculate that one timestamp is included. Similarly, if the PHR length field indicates 13, 17, or 21, the receiver may determine that there are respectively 2, 3, or 4 timestamps included.

FIG. 7 illustrates a report compressed PSDU 700 comprising cryptographic protection in accordance with some embodiments. The report compressed PSDU 700 is a specific implementation of the compressed PSDU 400 of FIG. 4. As shown, the report compressed PSDU 700 may comprise a 1-octet message ID 702, 2-octet session identifier/address 704, a 4- or 5-octet timestamp(s) field 708, and 8-octet cryptographic protection included in MAC footer 706.

The message ID 702 may indicate that the report compressed PSDU 700 report PSDU. For example, the message ID 702 may be set to 0x02 to indicate a report PSDU. The identifier/address 704 may indicate the address of the receiving radio.

In the illustrated embodiment, the ID specific data included in the report compressed PSDU 700 is the timestamp(s) field 708. The timestamp(s) field 708 may indicate when one or more UWB transmissions (e.g., transmissions 106, 108, 110, 112, 114, 116 of FIG. 1) were received. In some embodiments, the timestamp(s) field 504 may include one or more timestamps.

The total length of the report compressed PSDU 700 may be 15 or more octets. The size may depend on the number of timestamps included in the timestamp(s) field 708. A receiver may determine the number of timestamps based on a received PHR length field. If the PHR length field indicates that the report compressed PSDU 700 has a length of 15 octets than the receiver (e.g., controller/initiator or controlee/responder) may calculate that one timestamp is included. Similarly, if the PHR length field indicates 19, the receiver may determine that there are 2 timestamps included.

The MAC footer 706 may include cryptographic protection (e.g., ENC-MIC-64) for the report compressed PSDU 700. Rather than including the CRC16 of the embodiments shown in FIGS. 5-6, the CRC16 may be removed due to redundancy with the ENC-MIC-64 of the MAC footer.

The total length of the report compressed PSDU 700 may be 15 or more octets. The size may depend on the number of timestamps included in the timestamp(s) field 708. A receiver may determine the number of timestamps based on a received PHR length field. If the PHR length field indicates that the report compressed PSDU 700 has a length of 15 octets then the receiver (e.g., controller/initiator or controlee/responder) may calculate that one timestamp is included.

FIG. 8 illustrates a flow chart of a method 800 for a controller/initiator executing a ranging session using the compressed PSDUs discussed herein. The compressed PSDU may be adaptable based on the ID. For instance, a poll and response PSDU may contain different data and be a different size than a report PSDU.

As shown, the controller may encode 802 and transmit a poll transmission to a second wireless device for a ranging session using a compressed PSDU. The compressed PSDU may be encoded as discussed with dereference to FIG. 5.

The controller may receive 804 and decode a response transmission from the second wireless device for the ranging session in a compressed PSDU. The compressed PSDU for the response transmission may be encoded as discussed with dereference to FIG. 5. The controller may transmit 806 one or more ranging transmissions to the second wireless device. Additionally, the controller may receive 808 one or more ranging transmissions from the second wireless device The controller may receive 810 and decode a report transmission from the second wireless device in a compressed PSDU. Additionally, the controller may encode 812 and transmit a report transmission to the second wireless device in a compressed PSDU. The compressed PSDUs for the reports may be formatted as discussed with reference to FIGS. 6 and 7.

FIG. 9 illustrates a flow chart of a method 900 for a controlee/responder executing a ranging session using the compressed PSDUs discussed herein. The compressed PSDU may be adaptable based on the ID. For instance, a poll and response PSDU may contain different data and be a different size than a report PSDU.

As shown, the controlee may receive 902 and decode a poll transmission from a second wireless device for a ranging session in a compressed PSDU. The compressed PSDU may be formatted as discussed with dereference to FIG. 5.

The controlee may encode 904 and transmit a response transmission to the second wireless device for the ranging session in a compressed PSDU. The compressed PSDU for the response transmission may be encoded as discussed with dereference to FIG. 5. The controlee may transmit 906 one or more ranging transmissions to the second wireless device. Additionally, the controlee may receive 908 one or more ranging transmissions from the second wireless device The controlee may encode 910 and transmit a report transmission to the second wireless device in a compressed PSDU. Additionally, the controlee may receive 912 and decode a report transmission from the second wireless device in a compressed PSDU. The compressed PSDUs for the reports may be formatted as discussed with reference to FIGS. 6 and 7.

Figure 10:
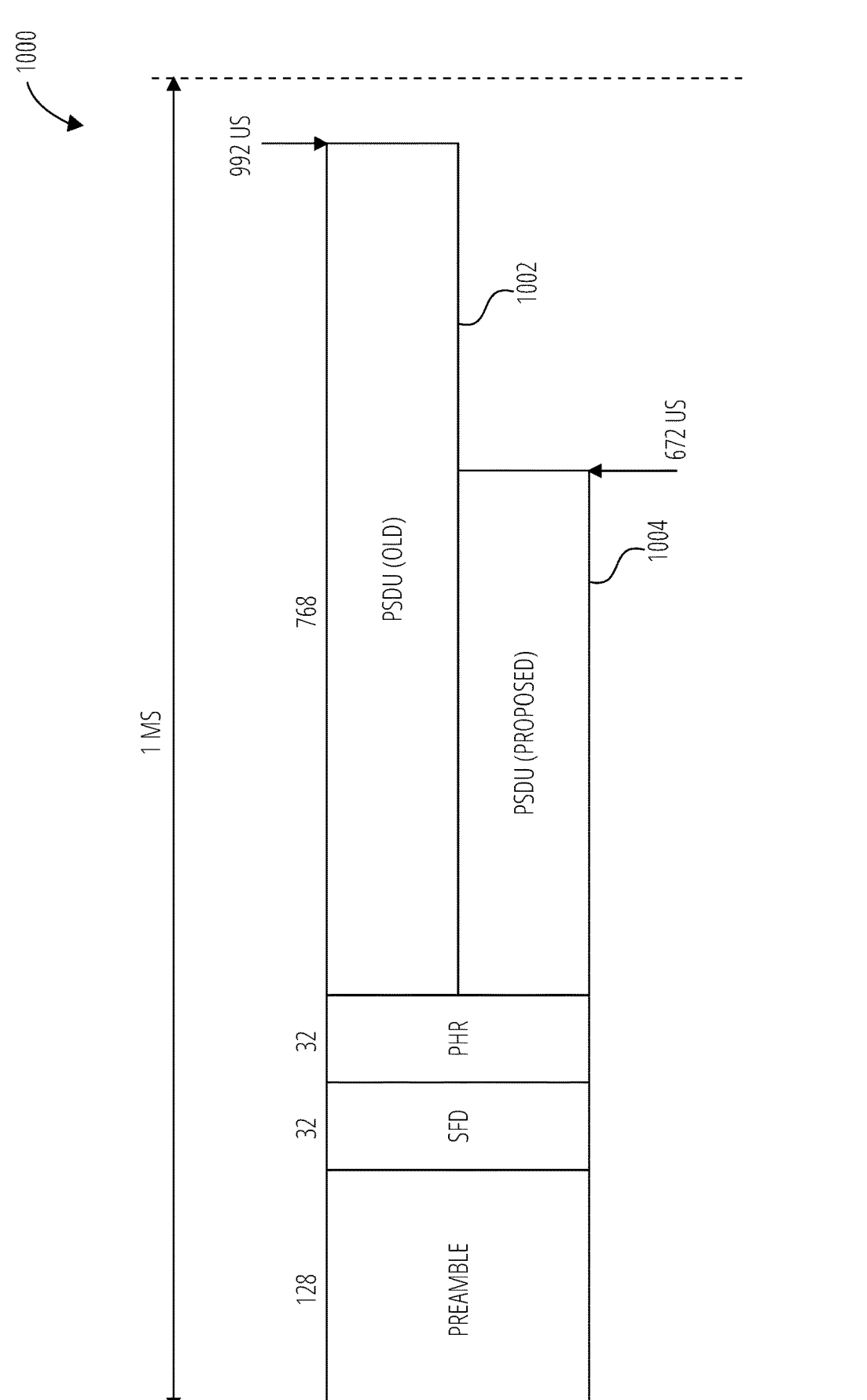
FIG. 10 illustrates a frame length comparison between an old PSDU using the nested format shown in FIG. 2 and a new PSDU using the formatting discussed with reference FIGS. 3-7 in accordance with some embodiments.

FIG. 10 illustrates a frame length comparison 1000 between an old PSDU 1002 using the nested format shown in FIG. 2 and a new PSDU 1004 using the compressed formatting discussed with reference FIGS. 3-7 in accordance with some embodiments. The PSDUs shown are for a Secured Timestamp Report using 250 kbit/s O-QPSK PHY.

The 4z-based RMI IE format of the old PSDU 1002 leaves an insufficient trail pause for back to back transmission in 1 ms grid. As shown, the old PSDU 1002 is 992 microseconds (μs) long. This leaves less than ten μs for TX/RX switching. It may be very challenging to accomplish the TX/RX switching within this amount of time.

The new PSDU 1004 format reduces overall frame duration by 30 percent. As shown, the new PSDU 1004 is 672 μs leaving ample time for TX/RX switching within the 1 ms grid. Accordingly, the new PSDU 1004 may facilitate back to back transmission within a 1 ms grid.

Figure 11:
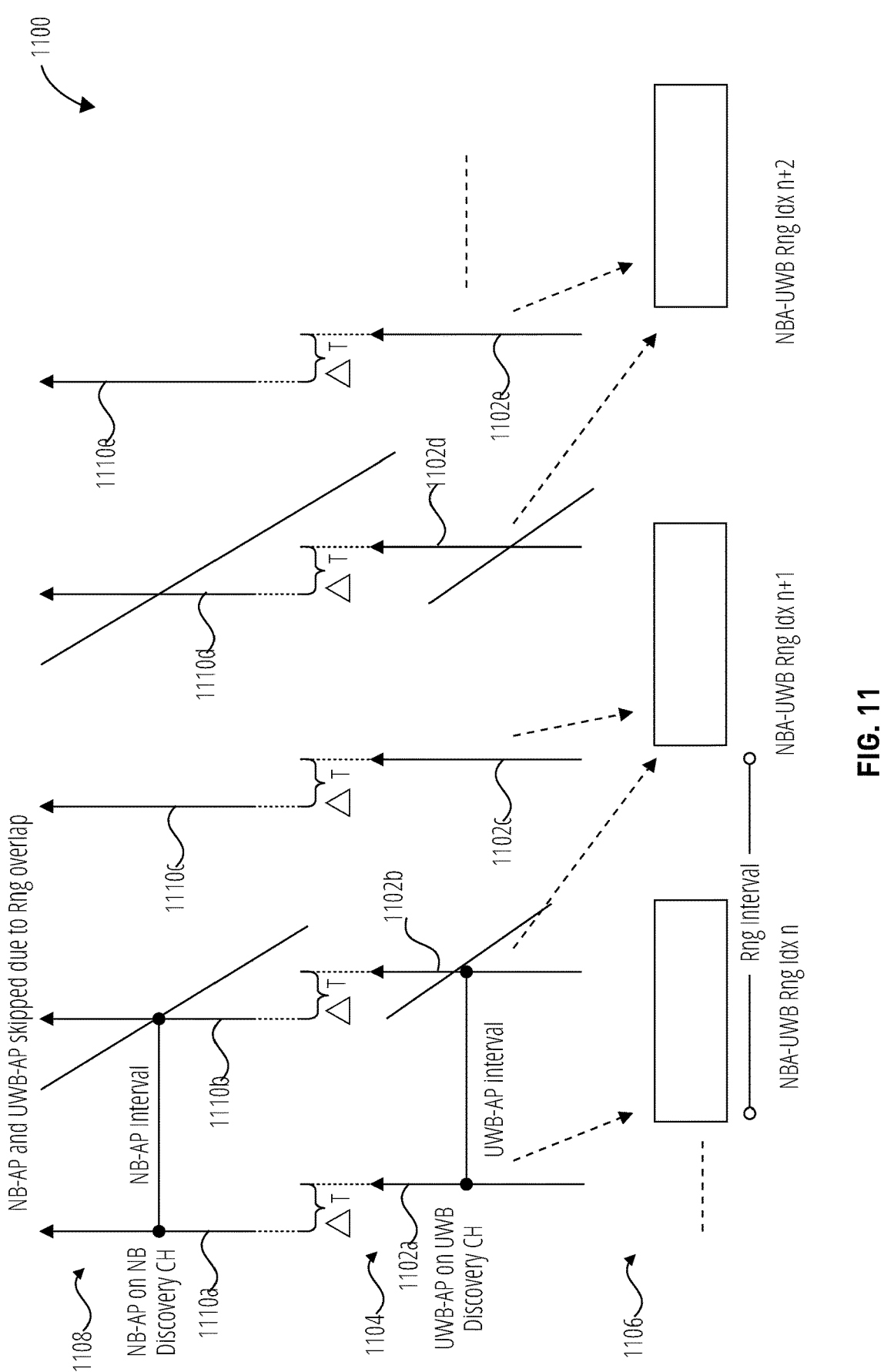
FIG. 11 illustrates an example OOB-aided UWB transmission schedule of a transmitter or initiator for UWB channel usage coordination in accordance with some embodiments.

FIG. 11 illustrates an example OOB-aided discovery schedule 1100 of a transmitter or initiator for UWB channel usage coordination in accordance with some embodiments. As shown, there may be three types of signals sent by a transmitter during the OOB-aided discovery schedule 1100. The transmissions from a transmitter may include acquisition packets (APs) on an NB discovery channel 1108, APs on a UWB discovery channel 1104, and UWB activity 1106. In the illustrated embodiment, APs on the UWB discovery channel 1104 and the UWB activity 1106 are sent by the transmitter using UWB frequencies, and the APs on the NB discovery channel 1108 may be sent using narrowband (NB) frequencies. The UWB discovery channel 1104 and the NB discovery channel 1108 facilitate broadcasting of APs to facilitate discovery of other devices.

A transceiver may send a series of NB-APs (e.g., NB-AP 1110*a*, NB-AP 1110*b*, NB-AP 1110*c*, NB-AP 1110*d*, NB-AP 1110*e*) on NB discovery channel 1108. The NB APs broadcast a reference to an UWB-AP (e.g., UWB-AP 1102*a*, UWB-AP 1102*b*, UWB-AP 1102*c*, UWB-AP 1102*d*, UWB-AP 1102*e*) on a preferred channel. A receiving device may determine from the NB-APs the timing of the UWB-APs.

The transceiver may send the UWB-APs on the UWB discovery channel 1104. The UWB-APs may convey session information and enable interference management for the UWB activity 1106. UWB activity 1106 may include ranging and high speed data communication (e.g., streaming). If UWB activity 1106 overlaps with a UWB-AP, the transmitter may skip sending that occurrence of the UWB-AP and the associated OOB-AP. For example, NB-AP 1110*b*, NB-AP 1110*d*, UWB-AP 1102*b*, and UWB-AP 1102*d* are skipped because of ranging activity. While the illustrated embodiment only includes ranging, UWB activity 1106 may also include high speed data communication such as streaming.

While the compressed PSDU format discussed in FIGS. 3-7 may work for a pre-established point to point connection, additional information may be needed for the discover broadcasts (e.g., UWB-AP and NB-AP). For example, the transceiver sending the UWB-AP may provide information regarding the application of the UWB activity 1106 (e.g., ranging). Accordingly, the discovery broadcasts may use a different format.

The format may be tailored to the demands of the discovery use case. The discovery broadcasts may be non-recurring and therefore have sporadic traffic. As these broadcasts may be non-recurring, there is less power savings to be gained through optimization when compared to the application PSDUs discussed with reference to FIGS. 3-7. Additionally, the broadcast topology has an emphasis on cross-device interoperability. Further, broadcast traffic is mostly unencrypted therefore there is no gain over MIC/CRC redundancy.

Figure 12:
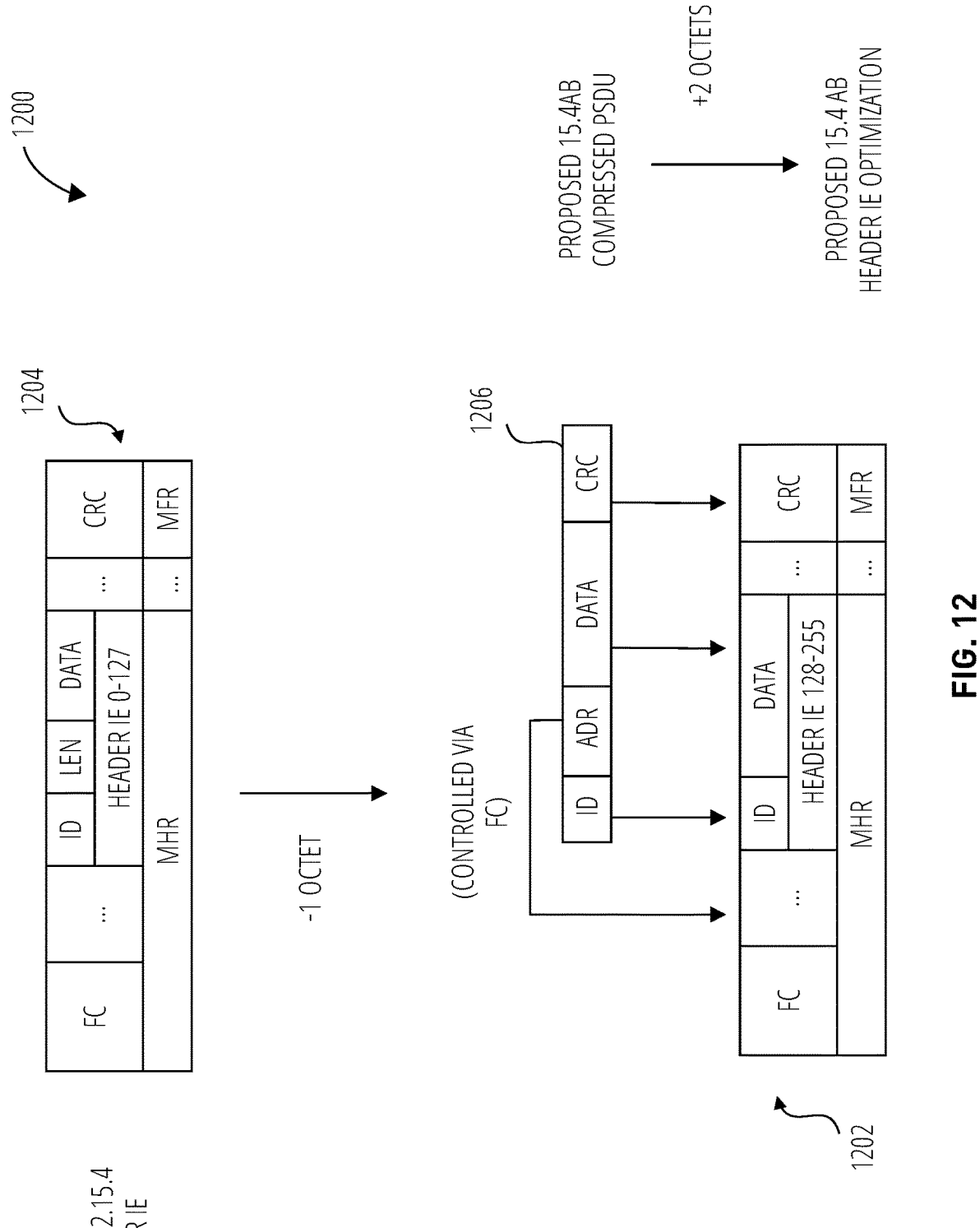
FIG. 12 illustrates a header IE in accordance with some embodiments.

Currently, discovery broadcasts use payload nested IEs as shown in FIG. 2. However, these nested IEs inflict unnecessary overhead. Some embodiments herein use header IEs for the broadcasts to reduce overhead. The header IE does not require the double encapsulation of the payload nested IEs and therefore has less overhead. Header IEs currently are not used much. In the header IE, currently bytes 0-4 are used and bytes 5-255 are reserved. Accordingly, there is address space left unused. As shown in FIG. 12, the header IE bytes may be segmented to facilitate using a portion of the header IE for discovery broadcasts.

FIG. 12 illustrates a header IE 1200 in accordance with some embodiments. As shown, the header IE 1200 may be split into two groups. A first group may maintain legacy signaling 1204 for Header IEs 0-127. A second group may be an optimized format header IE 1202 for these broadcasts.

For example, the optimized format header IE 1202 may include header IEs 128-255. The optimized format header IE 1202 may strip out the IE length field when security and IE Header length field may not be needed. The optimized format header IE 1202 may remove redundant length field for simple IEs. Additionally, the optimized format header IE 1202 may offer flexibility/interoperability (cross-session) over different PHYs.

Further, a compressed PSDU 1206 may be mapped to the fields of the optimized format header IE 1202. Some embodiments may map the compressed PSDU format to 1002.15.4 MAC header (MHR) and MAC footer (MFR) via frame control (FC). For example, the address field may be mapped to a dedicated space in the MHR controlled via the FC. For example, in some embodiments the address field may be mapped to a destination short address field. The destination short address field is provided as an example, other fields may be used to map the address field to the header IE. Further, the ID field of the compressed PSDU 1206 may be mapped to the ID field of the header IE. The data field of the compressed PSDU 1206 may be mapped to the data field of the header IE. The CRC field of the compressed PSDU 1206 may be mapped to the CRC field of the header IE.

Figure 13:
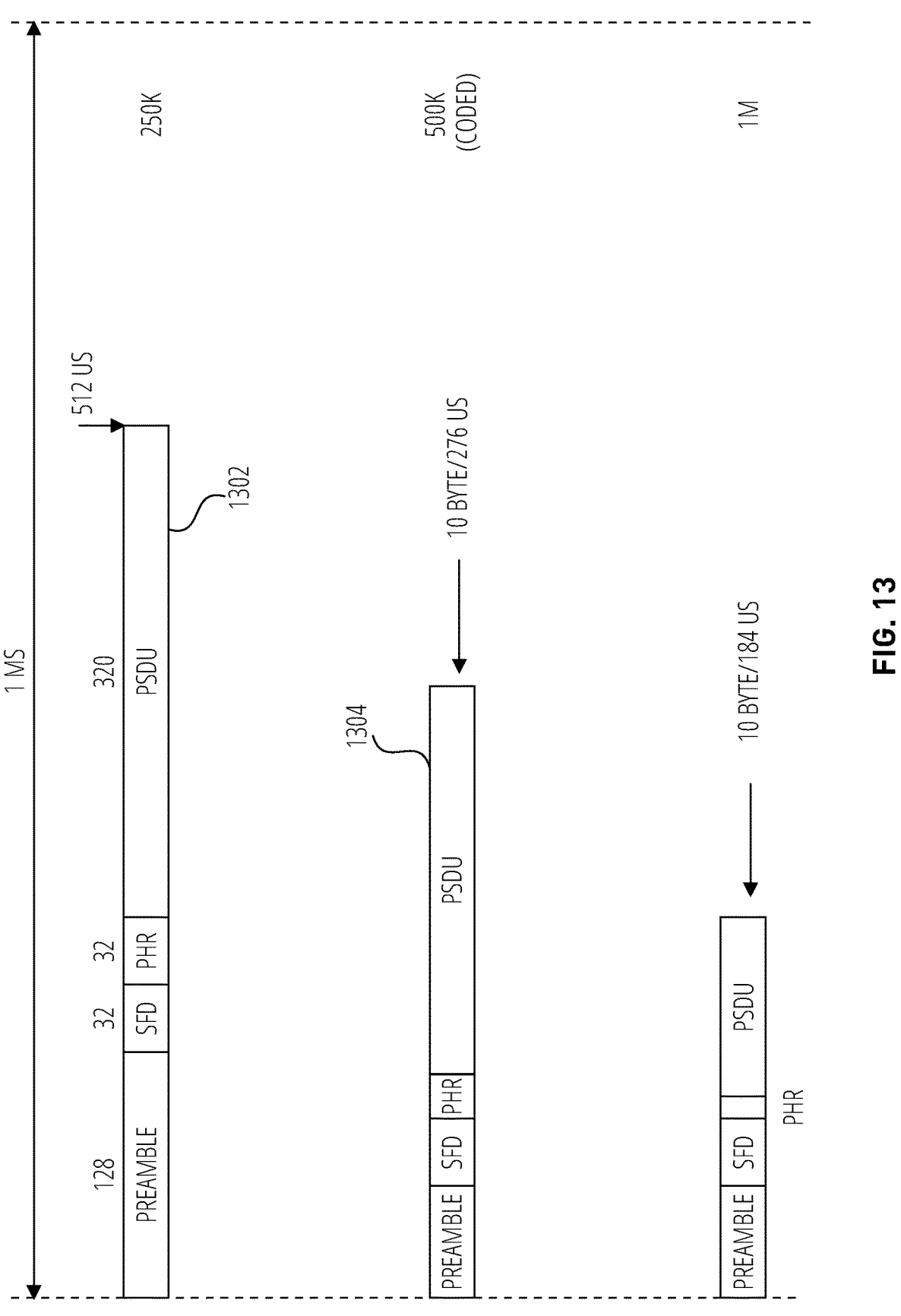
FIG. 13 illustrates an O-QPSK capacity comparison in accordance with some embodiments.

FIG. 13 illustrates an O-QPSK capacity comparison. As the NB channel has a small capacity, an increase of data rate using shorter symbols may further increase the amount of data that may be transmitted in the 1 MS frame. O-QPSK PHYs 500 k 1304 may be used in combination with the PSDUs discussed herein for further optimization.

The O-QPSK 250 k encoded 1302 transmission includes a 6.8 dB excess link budget over MMS UWB with 8 fragments. The 6.8 dB may be used to balance link budget of 32-fragment MMS-UWB.

O-QPSK PHYs 500 k 1304 (CC, r=½, K=7) is shown to have a 46% frame duration reduction for 10-bytes PSDU over 250 k. O-QPSK PHYs 500 k 1304 may have sufficient link budget to support approximately up to 8, or 16 fragments MMS-UWB. In some embodiments, both PHYs for NBA-MMS-UWB may support O-QPSK PHYs 500 k 1304.

Some embodiments herein include a NBA-MMS-UWB PSDU proposal where no cross-session communication is required. An existing RMI IE scheme is not suitable to support one encrypted timestamp report. The proposed PSDU format gains a 30% advantage of packet duration. Cyclic recurrence of Poll, Resp, Report frames maximizes profit (energy, PER, . . . ).

Some embodiments herein include a header IE Format Optimization Proposal. The optimized header IE may provide backward compatible with 1002.15.4a-z header IE format. Further, the proposed format optimization reduces overhead by 3 bytes over 4z nested IE. This may be beneficial for cross-session/broadcast communication (e.g., discovery).

Some embodiments herein include a proposal to use 500 k (CC,K=7) baseline. This may offer balanced link budget for 16 fragment MMS-UWB and frame duration reduction over 250 k O-QPSK PHY. While the illustrated embodiment includes O-QPSK 500 k and O-QPSK 250 k, the embodiments herein can be applied to other PHY layer modulation.

FIG. 14A-14C are tables comprising information regarding compressed PSDU messages in accordance with some embodiments. The compressed PSDU format may be used for control, report, and initialization messages.

FIG. 14A illustrates the PDSU for the control phase 1402 in accordance with some embodiments. The control phase 1402 may include a poll message 1404 and a response message 1406. The poll message 1404 may include multiple fields including a private address, a private address salt field, a message control field, the message content, and a CRC 16 field. The response message 1406 may include multiple fields including a private address, a message control field, the message content, and a CRC 16 field. Additionally, the control phase 1402 may include a poll message 1422 for one-to-many ranging session and a response message 1424 for one-to-many ranging.

FIG. 14B illustrates the PDSU for the measurement report phase 1408 in accordance with some embodiments. The measurement report phase 1408 may include a report from responder 1410 and a report from initiator 1412. The report from responder 1410 may include multiple fields including a private address, a reply time, a data length field, a data field, and a CRC 16 field. The report from initiator 1412 may include multiple fields including a private address, a roundtrip time, a data length field, a data field, and a CRC 16 field. Additionally, the measurement report phase 1408 may include a report from responder 1426 for one-to-many ranging session and a report from initiator 1428 for one-to-many ranging.

FIG. 14C illustrates the PDSU for the initialization phase 1414 in accordance with some embodiments. The initialization phase 1414 may include an advertising poll message 1416 used by the initiator during the initialization phase. The initialization phase 1414 may include an advertising response packet 1418 used by the initiator during the initialization phase. The initialization phase 1414 may include a start of ranging packet 1420 used by the initiator during the initialization phase. In some embodiments, the initialization phase 1414 may reserve an octet for out of session. In some embodiments, some messages and fields may be reserved for vendor specific applications.

FIG. 15 illustrates a table 1500 comprising information regarding compressed PSDU message fields in accordance with some embodiments. As shown, the CRC16 field 1502 may be 16 bits in length and may include a 2-octet frame check sequence (FCS). The private address field 1504 may be 24 bits in length. The private salt field 1506 may be 24 bits in length and may be static during at least one ranging block. The message control field 1508 may be 8 bits in length and may provide control over message content. The message content field 1510 may vary in length and the content may be controlled by message ID and message control. The PT data length field 1512 may be 8 bits in length and provide the number of octets in the PT data field 1514. The PT data field 1514 may be eight times the value of the PT data length field 1512. The PT data field 1514 may include optional data passed through to a next higher layer.

The compressed PSDU message fields may include an NB channel selection field 1516. Also, the compressed PSDU message fields may include a UWB PHY Config field 1518. Also, the compressed PSDU message fields may include a UWB MAC Config field 1520. Also, the compressed PSDU message fields may include a NB MAC Config field 1522. Also, the compressed PSDU message fields may include a time offset field 1524. Also, the compressed PSDU message fields may include a NB channel seed field 1526. Also, the compressed PSDU message fields may include a NB PHY Config field 1528.

Figure 16:
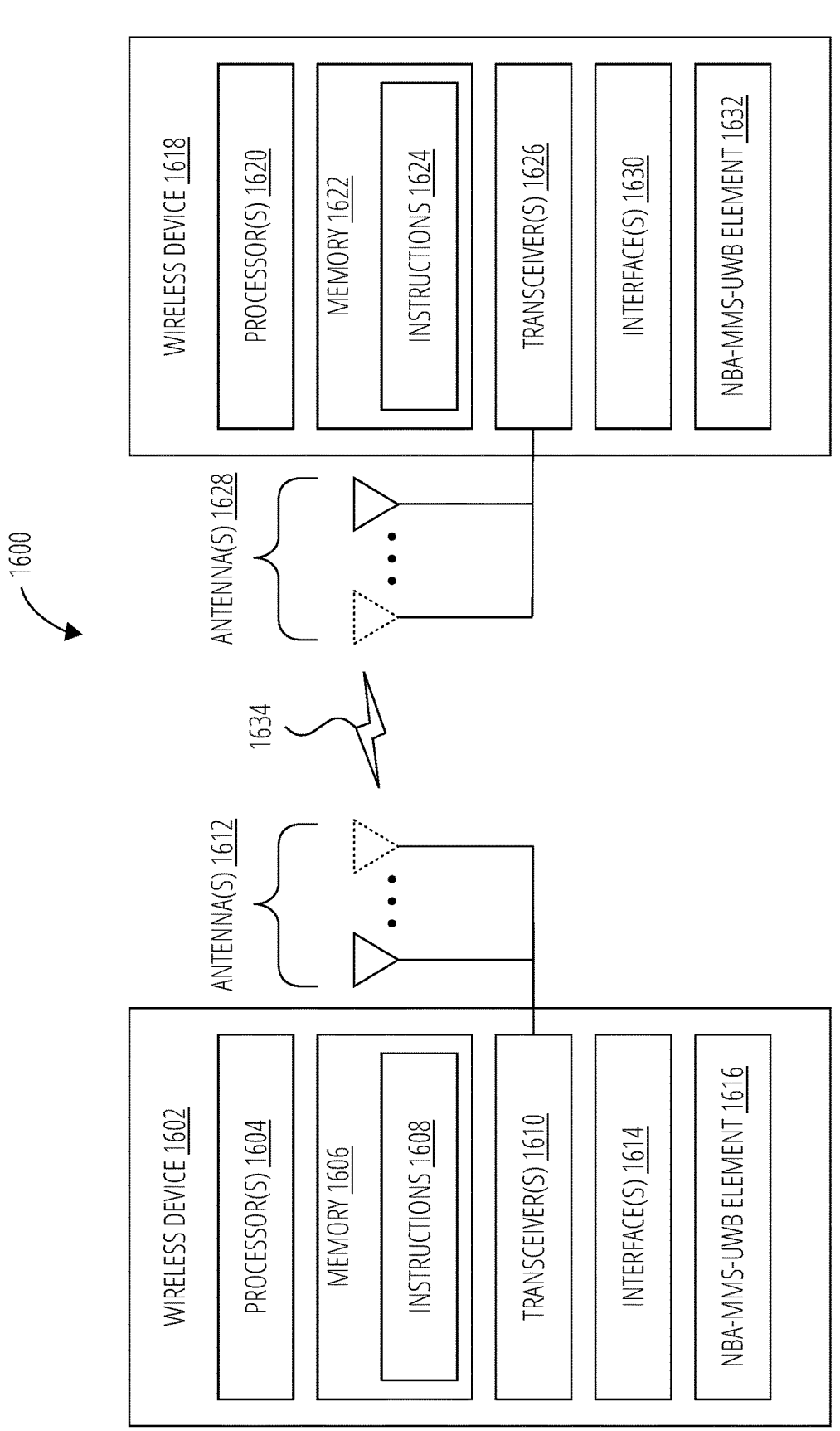
FIG. 16 illustrates a system for performing signaling between a wireless device and a network device, according to embodiments disclosed herein.

FIG. 16 illustrates a system 1600 for performing signaling 1634 between two wireless devices (i.e., first wireless device 1602 and second wireless device 1618) according to embodiments disclosed herein. The system 1600 may be a portion of a wireless communications system as herein described. The wireless devices may be, for example, a user equipment (UE) of a wireless communication system, a beacon, a primary device, a controller, an initiator, a secondary devices, a controlee, or a responder.

The first wireless device 1602 may include one or more processor(s) 1604. The processor(s) 1604 may execute instructions such that various operations of the first wireless device 1602 are performed, as described herein. The processor(s) 1604 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The first wireless device 1602 may include a memory 1606. The memory 1606 may be a non-transitory computer-readable storage medium that stores instructions 1608 (which may include, for example, the instructions being executed by the processor(s) 1604). The instructions 1608 may also be referred to as program code or a computer program. The memory 1606 may also store data used by, and results computed by, the processor(s) 1604.

The first wireless device 1602 may include one or more transceiver(s) 1610 that may include radio frequency (RF) transmitter and/or receiver circuitry that use the antenna(s) 1612 of the first wireless device 1602 to facilitate signaling (e.g., the signaling 1634) to and/or from the first wireless device 1602 with other devices (e.g., the second wireless device 1618) according to corresponding RATs.

The first wireless device 1602 may include one or more antenna(s) 1612 (e.g., one, two, four, or more). For embodiments with multiple antenna(s) 1612, the first wireless device 1602 may leverage the spatial diversity of such multiple antenna(s) 1612 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the first wireless device 1602 may be accomplished according to precoding (or digital beamforming) that is applied at the first wireless device 1602 that multiplexes the data streams across the antenna(s) 1612 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the first wireless device 1602 may implement analog beamforming techniques, whereby phases of the signals sent by the antenna(s) 1612 are relatively adjusted such that the (joint) transmission of the antenna(s) 1612 can be directed (this is sometimes referred to as beam steering).

The first wireless device 1602 may include one or more interface(s) 1614. The interface(s) 1614 may be used to provide input to or output from the first wireless device 1602. For example, a first wireless device 1602 that is a UE may include interface(s) 1614 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 1610/antenna(s) 1612 already described) that allow for communication between the UE and other devices and may operate according to known protocols (e.g., Wi-Fi®, Bluetooth®, and the like).

The first wireless device 1602 may include an NBA-MMS-UWB element 1616. The NBA-MMS-UWB element 1616 may be implemented via hardware, software, or combinations thereof. For example, the NBA-MMS-UWB element 1616 may be implemented as a processor, circuit, and/or instructions 1608 stored in the memory 1606 and executed by the processor(s) 1604. In some examples, the NBA-MMS-UWB element 1616 may be integrated within the processor(s) 1604 and/or the transceiver(s) 1610. For example, the NBA-MMS-UWB element 1616 may be implemented by a combination of software components (e.g., executed by a DSP or a general processor) and hardware components (e.g., logic gates and circuitry) within the processor(s) 1604 or the transceiver(s) 1610.

The NBA-MMS-UWB element 1616 may be used for various aspects of the present disclosure, for example, aspects of FIGS. 1, 2-10. The NBA-MMS-UWB element 1616 is configured to encode or decode PSDUs or header IEs.

The second wireless device 1618 may include one or more processor(s) 1620. The processor(s) 1620 may execute instructions such that various operations of the second wireless device 1618 are performed, as described herein. The processor(s) 1620 may include one or more baseband processors implemented using, for example, a CPU, a DSP, an ASIC, a controller, an FPGA device, another hardware device, a firmware device, or any combination thereof configured to perform the operations described herein.

The second wireless device 1618 may include a memory 1622. The memory 1622 may be a non-transitory computer-readable storage medium that stores instructions 1624 (which may include, for example, the instructions being executed by the processor(s) 1620). The instructions 1624 may also be referred to as program code or a computer program. The memory 1622 may also store data used by, and results computed by, the processor(s) 1620.

The second wireless device 1618 may include one or more transceiver(s) 1626 that may include RF transmitter and/or receiver circuitry that use the antenna(s) 1628 of the second wireless device 1618 to facilitate signaling (e.g., the signaling 1634) to and/or from the second wireless device 1618 with other devices (e.g., the first wireless device 1602) according to corresponding RATs.

The second wireless device 1618 may include one or more antenna(s) 1628 (e.g., one, two, four, or more). In embodiments having multiple antenna(s) 1628, the second wireless device 1618 may perform MIMO, digital beam-forming, analog beamforming, beam steering, etc., as has been described.

The second wireless device 1618 may include one or more interface(s) 1630. The interface(s) 1630 may be used to provide input to or output from the second wireless device 1618. For example, a second wireless device 1618 that is a base station may include interface(s) 1630 made up of transmitters, receivers, and other circuitry (e.g., other than the transceiver(s) 1626/antenna(s) 1628 already described) that enables the base station to communicate with other equipment in a core network, and/or that enables the base station to communicate with external networks, computers, databases, and the like for purposes of operations, administration, and maintenance of the base station or other equipment operably connected thereto.

The second wireless device 1618 may include an NBA-MMS-UWB element 1632. The NBA-MMS-UWB element 1632 may be implemented via hardware, software, or combinations thereof. For example, the NBA-MMS-UWB element 1632 may be implemented as a processor, circuit, and/or instructions 1624 stored in the memory 1622 and executed by the processor(s) 1620. In some examples, the NBA-MMS-UWB element 1632 may be integrated within the processor(s) 1620 and/or the transceiver(s) 1626. For example, the NBA-MMS-UWB element 1632 may be implemented by a combination of software components (e.g., executed by a DSP or a general processor) and hardware components (e.g., logic gates and circuitry) within the processor(s) 1620 or the transceiver(s) 1626.

The NBA-MMS-UWB element 1632 may be used for various aspects of the present disclosure, for example, aspects of FIGS. 1, 2-10. The NBA-MMS-UWB element 1632 is configured to encode or decode PSDUs or header IEs.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a wireless device, the method comprising:
encoding data into a compressed physical layer (PHY) service data unit (PSDU) comprising a poll transmission, a response transmission, or a report transmission, wherein the compressed PSDU is associated with an operation to determine an estimated distance between the wireless device and a second wireless device,
wherein the compressed PSDU comprises:
an identifier (ID) field indicating whether the compressed PSDU is the poll transmission, the response transmission, or the report transmission, and
ID specific content following the ID field; and
transmitting the compressed PSDU to the second wireless device.

2. The method of claim 1, wherein the PSDU further comprises an address field that indicates an address of the second wireless device.

3. The method of claim 1, wherein when the ID field indicates that the PSDU is the poll transmission or the response transmission, the ID specific content comprises a block index.

4. The method of claim 3, further comprising:
receiving a Physical Layer Header (PHR) length field,
receiving a second compressed PSDU from the second wireless device, and
determining presence of the block index based on the PHR length field.

5. The method of claim 1, wherein when the ID field indicates that the PSDU is the report transmission, the ID specific content comprises one or more timestamps.

6. The method of claim 1, further comprising:
transmitting one or more transmissions;
receiving a compressed report PSDU from the second wireless device comprising one or more timestamps corresponding to when the second wireless device receives the one or more transmissions, and
determining a number of timestamps in the compressed report PSDU based on a PHR length field,
decoding the compressed report PSDU, and
determining a distance between the wireless device and the second wireless device based on the one or more timestamps in the compressed report PSDU.

7. The method of claim 1, further comprising:
encoding a header information element (IE) by mapping the compressed PSDU to fields in the header IE; and
transmitting the header IE.

8. The method of claim 1, wherein the PSDU is transmitted using Offset Quadrature Phase Shift Keying (O-QPSK) PHY.

9. A wireless device comprising:
a processor; and
a memory storing instructions that, when executed by the processor, configure the wireless device to:
encode data for a poll transmission for an operation to determine an estimated distance between the wireless device and a second wireless device into a compressed physical layer (PHY) service data unit (PSDU), wherein the compressed PSDU comprises:
an identifier (ID) field indicate that the PSDU is the poll transmission, and
a block index that indicates a count for the poll transmission; and
transmit the compressed PSDU to the second wireless device to configure the operation with the second wireless device.

10. The wireless device of claim 9, wherein the compressed PSDU further comprises an address field that indicates an address of the second wireless device.

11. The wireless device of claim 9, wherein the instructions further configure the wireless device to encode and transmit a Physical Layer Header (PHR) length field indicating presence of the block index in the PSDU.

12. The wireless device of claim 9, wherein the instructions further configure the wireless device to:
transmit one or more transmissions for an operation to estimate a distance between the wireless device and a second wireless device;
receive a compressed report PSDU from the second wireless device comprising one or more timestamps corresponding to when the second wireless device receives the one or more transmissions, and
determine a number of timestamps in the compressed report PSDU based on a PHR length field,
decode the compressed report PSDU, and
determine a distance between the wireless device and the second wireless device based on the one or more timestamps in the compressed report PSDU.

13. The wireless device of claim 9, wherein the instructions further configure the wireless device to:
encode a header information element (IE) by mapping the compressed PSDU to fields in the header IE; and
transmit the header IE.

14. The wireless device of claim 9, wherein the PSDU is transmitted using Offset Quadrature Phase Shift Keying (O-QPSK) PHY 500 k.

15. A non-transitory computer-readable storage medium, the computer-readable storage medium including instructions that when executed by a wireless device, cause the wireless device to:

encode data into a compressed physical layer (PHY) service data unit (PSDU) comprising a poll transmission, a response transmission, or a report transmission, wherein the compressed PSDU is associated with an operation to determine an estimated distance between the wireless device and a second wireless device, wherein the compressed PSDU comprises:

an identifier (ID) field indicating whether the compressed PSDU is the poll transmission, the response transmission, or the report transmission, and ID specific content follow the ID field; and transmit the compressed PSDU to the second wireless device.

16. The computer-readable storage medium of claim 15, wherein the PSDU further comprises an address field that indicates an address of the second wireless device.

17. The computer-readable storage medium of claim 15, wherein when the ID field indicates that the PSDU is the poll transmission or the response transmission, the ID specific content comprises a block index.

18. The computer-readable storage medium of claim 17, wherein the instructions further configure the wireless device to:

receive a Physical Layer Header (PHR) length field, receive a second compressed PSDU from the second wireless device, and determine presence of the block index based on the PHR length field.

19. The computer-readable storage medium of claim 15, wherein when the ID field indicates that the PSDU is the report transmission, the ID specific content comprises one or more timestamps.

20. The computer-readable storage medium of claim 15, wherein the instructions further configure the wireless device to:

transmit one or more transmissions;

receive a compressed report PSDU from the second wireless device comprising one or more timestamps corresponding to when the second wireless device receives the one or more transmissions, and determine a number of timestamps in the compressed report PSDU based on a PHR length field, decode the compressed report PSDU, and determine a distance between the wireless device and the second wireless device based on the one or more timestamps in the compressed report PSDU.

*   *   *   *   *